United States Patent [19]
Purdy

[11] 3,970,860
[45] July 20, 1976

[54] ELECTRICAL APPARATUS TO CONNECT TOWING VEHICLE LIGHT CIRCUITS TO A TRAILER LIGHT CIRCUIT WHEN THE TOWING VEHICLE HAS SEPARATE CIRCUITS RESPECTIVELY FOR TURNING AND STOP LIGHTS AND THE TRAILER HAS A COMMON LIGHT CIRCUIT FOR BOTH TURNING AND STOP LIGHTS

[76] Inventor: James P. Purdy, 203 154th Place SE., Bellevue, Wash. 98007

[22] Filed: Aug. 23, 1974

[21] Appl. No.: 499,897

[52] U.S. Cl. ............................... 307/10 LS; 340/67
[51] Int. Cl.² ........................................... B60Q 1/00
[58] Field of Search ..................... 307/10 R, 10 LS

[56] References Cited
UNITED STATES PATENTS

| | | | |
|---|---|---|---|
| 2,671,891 | 3/1954 | Kent | 307/10 R |
| 3,849,664 | 11/1974 | Bryant | 307/10 LS |

Primary Examiner—R. N. Envall, Jr.
Attorney, Agent, or Firm—Roy E. Mattern, Jr.

[57] ABSTRACT

The adapter circuit is interposed between the towing vehicle light circuit including at least a right turn light circuit, a brake light circuit, a left turn light circuit, and a light system common and the trailer light circuit including at least a left signal lamp and a right signal lamp. A right turn relay, operating a single normally closed contact, is connected to and responds to energization of the right turn light circuit. A brake relay, operating two normally closed contacts, is connected to and responds to energization of the brake light circuit. A left turn relay, operating a single normally closed contact, is connected to and responds to energization of the left turn light circuit. The right signal lamp is connected on one side to the light system common and on the other side through the first of the brake relay operated contacts to the right turn light circuit. The latter side is also connected through the right turn relay operated contact to the brake light circuit. The left signal lamp is connected on one side to the light system common and on the other side through the second of the brake relay operated contacts to the left turn light circuit. The latter side is also connected through the left turn relay operated contact to the brake light circuit. The adapter circuit results in operation of the trailer lamps to give the same type of signals on the trailer as appear on the towing vehicle. The adapter may be interposed between the trailer lights and the towing vehicle light circuits by the use of two of multiple contact adapters at each interface with the adapter.

2 Claims, 2 Drawing Figures

ELECTRICAL APPARATUS TO CONNECT TOWING VEHICLE LIGHT CIRCUITS TO A TRAILER LIGHT CIRCUIT WHEN THE TOWING VEHICLE HAS SEPARATE CIRCUITS RESPECTIVELY FOR TURNING AND STOP LIGHTS AND THE TRAILER HAS A COMMON LIGHT CIRCUIT FOR BOTH TURNING AND STOP LIGHTS

BACKGROUND OF THE INVENTION

Currently most foreign made vehicles have separate rear stop light and turn light circuits. They either use separate filaments of the same bulb or separate bulbs, i.e. on each side there is one independent bulb or filament for the brake signal and one for turn indication. Most United States made vehicles use the same bulb and filaments for both functions. When a trailer with a lighting system compatible for connection to a United States made vehicle is used with a foreign made vehicle normally the turn and stop light signals cannot be utilized together; either stop or turn signals individually but not both systems. If both stop and turn signal circuits are connected and the brakes are applied, the towing vehicle brake lights, the trailer signal lights, and the towing vehicle turn lights come on. This results in six additional lights being added to the towing vehicle's normal stop light circuit; two on the trailer and the four (two in front and two in the rear) direction indication lights on the towing vehicle. The stop signal, as a result, will be only a dim glow and ineffective, since the circuit is overloaded. Similarly if the turn signal is activated, since in the brake circuits the left and right lights are tied together and the trailer lights tie the towing vehicle turn and brake circuits respectively together, six lights are added to the towing vehicle's normal turn light circuit, overloading the circuit; two trailer lights, two towing vehicle stop lights, and the front and rear turn lights on the towing vehicle on the side opposite the turn direction. Consequently all of the stop and direction lights on the trailer and towing vehicle flash dimly if at all, and no direction is indicated. If the brakes are applied while the turn signal is on, only a dim to slightly dimmer flashing of all lights occurs. Diodes have been inserted in the connection wires to the trailer lights as a remedy, but this only partially solves the problem. The turn and brake signals can be used separately but when the brakes are applied while turning, the brake signal overrides the turn signal and no directional indication is given. Since the brakes are typically applied while waiting to turn or during a turn the loss of the direction signal on the trailer creates a hazardous condition. The trailer signal light adapter circuit is interposed between the towing vehicle circuit and the trailer circuit to give full signal operation at all times, alleviating the above-mentioned problems.

SUMMARY OF THE INVENTION

The trailer signal light adapter circuit is designed to allow connection of the turn and stop signal lights of a vehicle towing a trailer to those on the trailer when the towing vehicle has a signal light system typical of foreign made vehicles and the trailer is designed to be hooked to a vehicle with a brake and turn indication tail-light system typical of United States made vehicles. If directly hooked together the systems are imcompatible and either the stop light or the turn light system may be connected for operation but not both systems at the same time.

Currently, insertion of diodes in the connections are used as a partial solution to the problem. If the turn signal is used at the same time as the brake signal the turn indication signal will be lost, giving rise to a traffic hazard.

The trailer signal light adapter circuit when interposed between the towing vehicle and trailer circuit will result in fully operational signal functions.

The preferred embodiment of the circuit is composed of relays which operate to connect or isolate different portions of signal light circuits. There is a relay corresponding to each of the three signal conditions: left turn signal on, right turn signal on, and brake signal on. If the brake signal is on, the corresponding relay opens the connections from the towing vehicle turn lights to prevent their being lit. The trailer indication lights mimic the towing vehicle turn signal. If the turn signal is on the corresponding relay opens the connection to the opposite side trailer signal light and towing vehicle turn lights and to the towing vehicle brake lights to prevent their being lit. The trailer indication lights mimic the towing vehicle brake signal. If both the brake and the turn signal are operated then the two corresponding relays will again disconnect the circuits as before. The trailer light on the side of the direction of turning will turn off but will turn back on when the towing vehicle turn circuit is in the off portion of the flashing cycle because the brake circuit is still energized. The result is that the trailer tail-light flashes in the same direction as the towing vehicle lights but is 180 degrees out of phase; i.e. when the towing vehicle direction indicator light is on, the corresponding trailer light is off and vice versa. The trailer light on the side opposite the direction of turn indication remains on since it is still connected to the towing vehicle brake circuit. If both turn circuits on the towing vehicle are used, such as when the emergency flasher system is used, the corresponding relays open the connections to the brake circuit on the towing vehicle and the lights on the trailer flash with those on the towing vehicle. If the brakes are applied at the same time then the three relays open the circuits and the trailer lights are off. During the off portion of the flashing cycle the relays corresponding to the turn signals reclose the connections to the brake circuit and the trailer tail-lights go back on. The result is that the trailer lights flash when the towing vehicle lights flash but 180 degrees out of phase.

DESCRIPTION OF THE INVENTION

A trailer signal light adapter circuit that is designed to allow connection of a vehicle with a brake and turn indication tail-light system in which the brake indication circuit is separate from the turn indication system, typical of most foreign made vehicles and the trend for some United States made vehicles, to trailers that have brake and turn indication circuits which are common. Most United States made vehicles have the common brake and turn indication tail-light system. Without an adapter circuit the two systems are incompatible, and either one or the other signal circuits must be connected alone but not both. The adapter circuit allows connection of the trailer and towing vehicle signal systems together by interposing the adapter circuit between them. This will allow full operation of the signals with the same signals appearing on the trailer as appear on the towing vehicle.

Figure 1:
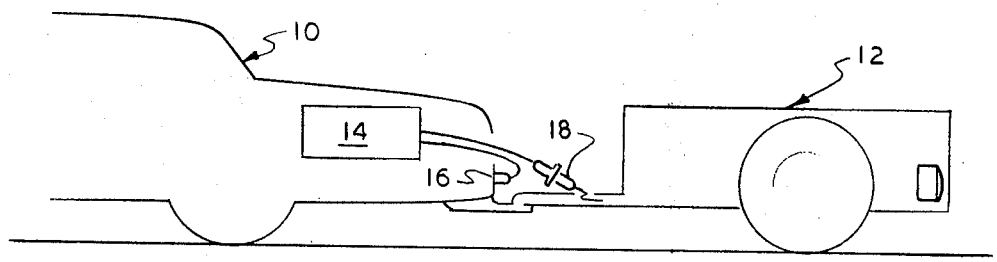
FIG. 1 is a partial schematic side elevation, indicating installation of electrical apparatus connecting towing vehicle light circuits to towed vehicle light circuits.

FIG. 1 is an elevation of an automobile 10, a trailer 12 showing the adapter circuit enclosed in a housing 14 which may be carried while in use in the rear trunk space of the automobile 10 used as a towing vehicle.

The adapter circuit contained in box 14 can be interposed in the normal lighting circuit by connecting one end to the towing vehicle automobile's trailer light multiple contact connector 16 by the use of a compatible electrical connector and connecting the other end to the trailer's light circuit multiple contact connector 18 by use of a compatible electrical connector. Normally, the automobile's trailer light connector 16 is directly connected to the trailer light circuit connector 18.

Figure 2:
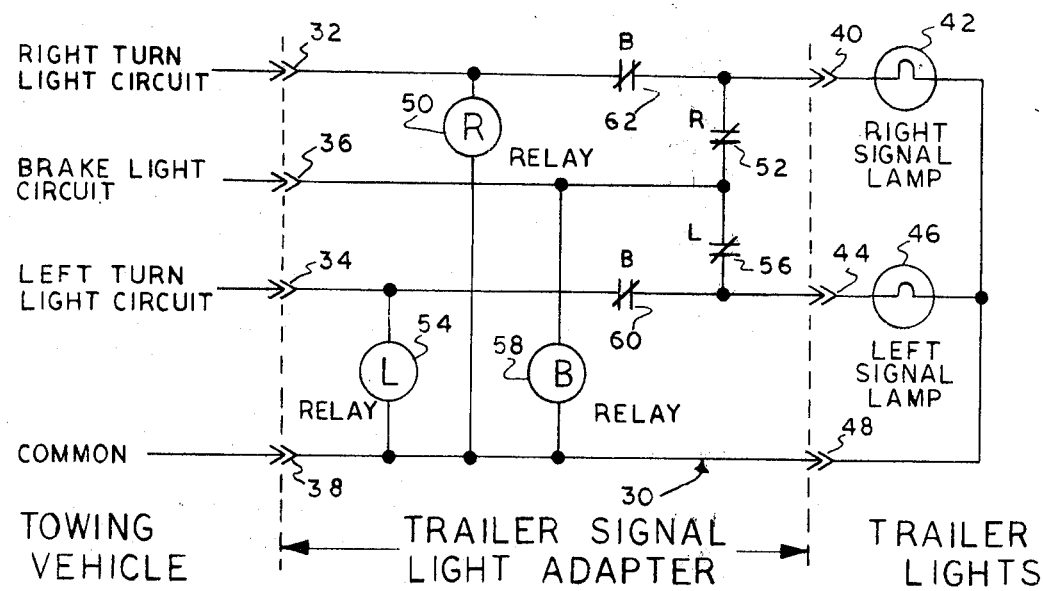
FIG. 2 is an electrical diagram of the electrical apparatus of FIG. 1, as connected to respective lighting circuits of towing vehicle and towed vehicle.

FIG. 2 shows the electrical diagram of the preferred embodiment of the invention. The adapter circuit 30 ties to the towing vehicle's light circuits at connection 32 for the right turn indicator light, connection 34 for the left turn indicator light, connection 36 for the brake lights, and at connection 38 for the circuit common.

The adapter circuit 30 ties to the trailer light circuit at connection 40 for the trailer right signal lamp 42 control, at connection 44 for the trailer left signal lamp 46 control, and at connection 48 for the circuit common.

When the towing vehicle right turn circuit operates, a voltage appears between connection 32 and 38. This energizes the trailer right lamp 42. It also energizes relay 50 opening the normally closed contact 52. This prevents the impressed voltage from lighting the trailer left lamp and lighting the towing vehicle left turn light circuit and brake light circuit.

When the towing vehicle left turn circuit operates, a voltage appears between connection 34 and 38. This lights the trailer left turn lamp 46. It also energizes relay 54 which opens the normally closed contact 56 preventing the impressed voltage from lighting the trailer right lamp 42 and the towing vehicle right turn light circuit and brake light circuit.

In both a right turn signal situation and a left turn signal situation where the towing vehicle brake circuit is not simultaneously operated the trailer lamps 42 and 46 will be on when the towing vehicle circuits are energized. When the towing vehicle turn circuits are off or during the off portion of the flashing cycle, no voltage appears between connections 32 and 38 or 36 and 38. In this case the trailer lamps 42 and 43 are unlit and relays 50 and 54 will be deenergized and contacts 52 and 56 will reclose. Thus the trailer lamps 42 and 46 will mimic the flashing of the corresponding turn lights on the towing vehicle.

When both turn circuits are operated simultaneously, without the brake system operating, as when an emergency flasher system is used, both relays 50 and 54 operate opening their associated contacts, 52 and 56 respectively, preventing lighting of the towing vehicle brake lights. The result is that the trailer lights flash in unison with the towing vehicle's rear signal lights.

When the towing vehicle brake light circuit operates, a voltage appears between connections 36 and 38, the trailer right lamp 42 and left lamp 46 turn on. Relay 58 energizes opening the normally closed contacts 60 and 62 which prevents the towing vehicle turn lights from lighting. It will be noted that due to the initially closed positions of contacts 52, 56, 60 and 62 the relays 50, 54 and 58 are all interconnected. Thus relays 50, 54 and 58 will all become energized. But since the associated contacts 52, 56, 60 and 62 open up, relays 50 and 54 become isolated from the brake signal and deenergize causing their corresponding contacts 52 and 56 to reclose. The brake signal remains applied to relay 58 and the associated contacts 60 and 62 prevent relays 50 and 54 from re-energizing. During this period of initial operation the signal applied to 36 is applied to the signal lamps 42 and 46 and then removed briefly when contacts 52 and 56 open for the period of time it takes contacts 52 and 56 to reclose upon de-energization of relays 54 and 58. This period of initial signal application, to the lamps, when utilizing standard commercially available relays, is shorter than the period it takes for a standard commercially available incandescent lamp to respond to the impressed signal by giving off a signal of normal brilliance for the impressed voltage. Thus due to the relatively longer time it takes for the lamps to light as compared to the time required for the relays and their associated contacts to operate no flickering of the lamp is noticed. The momentary operations of relays 50 and 54 does not affect adversely the overall results desired. It should be noted also that for identical reasons the results produced by the adapter is not adversely affected by the momentary operation of relays 54 and 58 when a signal is applied to 32 or by the momentary operation of relays 50 and 58 when a signal is applied to 34. When the towing vehicle brake light circuit voltage is removed the trailer right lamp 42 and left lamp 46 go out and relay 58 deenergizes closing contacts 60 and 62. Thus the trailer lights mimic the towing vehicle brake lights.

If a right turn signal is operated at the same time as the brake circuit is operated relays 50 and 58 operate opening contacts 52, 60 and 62. This will result in the trailer left lamp 46 being lit. When the voltage then appearing between contacts 32 and 38 is gone, i.e. when the flashing light is in the off portion of its cycle, relay 50 deenergizes reclosing contact 42 and the trailer right lamp 42 lights. The result is that the trailer left lamp remains lit and the trailer right lamp 46 flashes but it flashes on when the towing vehicle right turn lamp is off and is off when the towing vehicle right turn lamp is on.

Since the system is symmetrical a corresponding sequence occurs where a left turn signal is initiated while the brake light circuit is actuated.

Another embodiment would utilize two relays serving the same function as relay 58 with one relay operating contact 60 and one relay operating contact 62. The circuit being an equivalent of the preferred embodiment.

The operation of the relays could also be accomplished by electronic devices.

I claim:

1. An electrical apparatus for connecting trailer towing vehicle light circuits to trailer signal light circuits when the towing vehicle has separate circuits for turning and stop lights including a right turn light circuit, a brake light circuit, a left turn light circuit, and a light system common and the trailer has a common light circuit for both turning and stop lights including a right signal lamp and a left signal lamp each having a first and second terminal for connection to an electrical system, comprising:

a. a first relay responsive to the operation of the right turn light circuit;
b. a second relay responsive to the operation of the left turn light circuit;
c. a third relay responsive to the operation of the brake light circuit;
d. a means for electrically connecting the right turn light circuit to the first terminal of the right signal lamp said means having a contact operated by a third relay, the contact being open when the brake circuit is energized and closed when it is not;
e. a means for electrically connecting the brake light circuit to the first terminal of the right signal lamp said means having a contact operated by the first relay, the contact being open when the right turn light circuit is energized and closed when it is not;
f. a means for electrically connecting the brake light circuit to the first terminal of the left signal lamp said means having a contact operated by the second relay, the contact being open when the left turn light circuit is energized and closed when it is not;
g. a means for electrically connecting the left turn light circuit to the first terminal of the left signal lamp said means having a contact operated by the third relay, the contact being open when the left turn signal lamp is energized and closed when it is not;
h. a means for electrically connecting the common to the second terminal of the right signal lamp; and
i. a means for electrically connecting the common to the second terminal of the left signal lamp;

whereby turn and stop signals will appear on the towed vehicle signal lamps when such signals are present on the towing vehicle light circuits.

2. An electrical apparatus for connecting trailer towing vehicle light circuits to trailer signal light circuits when the towing vehicle has separate circuits for turning and stop lights including a right turn light circuit, a brake light circuit, a left turn light circuit, and a light system common and the trailer has a common light circuit for both turning and stop lights including a right signal lamp and a left signal lamp each having a first and second terminal for connection to an electrical system, comprising:

a. a first relay responsive to the operation of the right turn light circuit;
b. a second relay responsive to the operation of the left turn light circuit;
c. a third relay responsive to the operation of the brake light circuit;
d. a fourth relay responsive to the operation of the brake circuit;
e. a means for electrically connecting the right turn light circuit to the first terminal of the right signal lamp said means having a contact operated by the third relay, the contact being open when the brake circuit is energized and closed when it is not;
f. a means for electrically connecting the brake light circuit to the first terminal of the right signal lamp said means having a contact operated by the first relay, the contact being open when the right turn light circuit is energized and closed when it is not;
g. a means for electrically connecting the brake light circuit to the first terminal of the left signal lamp, said means having a contact operated by the second relay, the contact being open when the left turn light circuit is energized and closed when it is not;
h. a means for electrically connecting the left turn light circuit to the first terminal of the left signal lamp said means having a contact operated by the fourth relay, the contact being open when the left turn signal lamp is energized and closed when it is not;
i. a means for electrically connecting the common to the second terminal of the right signal lamp; and
j. a means for electrically connecting the common to the second terminal of the left signal lamp;

whereby turn and stop signals will appear on the towed vehicle signal lamps when such signals are present on the towing vehicle light circuits.

* * * * *